United States Patent
Jaskiewicz

(10) Patent No.: US 9,935,996 B2
(45) Date of Patent: Apr. 3, 2018

(54) SYSTEMS, METHODS AND COMPUTER PROGRAM PRODUCTS FOR DYNAMIC USER PROFILE ENRICHMENT AND DATA INTEGRATION

(71) Applicant: Open Text SA ULC, Halifax (CA)

(72) Inventor: Michael Gerard Jaskiewicz, Urbandale, IA (US)

(73) Assignee: Open Text SA ULC, Halifax, CA (US)

( * ) Notice: Subject to any disclaimer, the term of this patent is extended or adjusted under 35 U.S.C. 154(b) by 251 days.

(21) Appl. No.: 14/832,180

(22) Filed: Aug. 21, 2015

(65) Prior Publication Data
US 2016/0057195 A1    Feb. 25, 2016

Related U.S. Application Data

(60) Provisional application No. 62/040,209, filed on Aug. 21, 2014.

(51) Int. Cl.
| | |
|---|---|
| *G06F 15/16* | (2006.01) |
| *H04L 29/08* | (2006.01) |
| *H04L 29/06* | (2006.01) |

(52) U.S. Cl.
CPC .......... *H04L 67/02* (2013.01); *H04L 65/1006* (2013.01); *H04L 67/306* (2013.01)

(58) Field of Classification Search
CPC .... H04L 67/02; H04L 67/306; H04L 65/1006
See application file for complete search history.

(56) References Cited

U.S. PATENT DOCUMENTS

| 4,996,662 | A | 2/1991 | Cooper et al. |
| 5,181,162 | A | 1/1993 | Smith et al. |
| 5,655,130 | A | 8/1997 | Dodge et al. |
| 2004/0117376 | A1* | 6/2004 | Lavin ................. G06Q 30/06 |
| 2010/0198870 | A1* | 8/2010 | Petersen ............ G06Q 10/10 |
| | | | 707/780 |
| 2012/0317238 | A1* | 12/2012 | Beard .................. H04L 63/10 |
| | | | 709/219 |
| 2013/0191372 | A1* | 7/2013 | Lee ............... G06F 17/30958 |
| | | | 707/722 |
| 2014/0229498 | A1* | 8/2014 | Dillon ............. G06F 17/3064 |
| | | | 707/767 |
| 2014/0355789 | A1* | 12/2014 | Bohrarper ............ H04R 3/00 |
| | | | 381/119 |
| 2015/0134746 | A1* | 5/2015 | Offenhartz ........ H04L 67/306 |
| | | | 709/205 |
| 2015/0135214 | A1* | 5/2015 | Reisman .......... H04N 21/64322 |
| | | | 725/37 |
| 2015/0293989 | A1* | 10/2015 | Bhargava ........ G06F 17/30598 |
| | | | 707/737 |

* cited by examiner

*Primary Examiner* — Richard G Keehn
(74) *Attorney, Agent, or Firm* — Sprinkle IP Law Group

(57) ABSTRACT

A system is disclosed for delivering dynamically-rendered web experiences enriched with external user profile data. The system establishes a provider connection with a provider system external to the system. The provider connection connects a page component of a network site and a provider service executing on the provider system. During web content delivery, the system accesses the provider connection and queries the provider service about a user visiting the network site. The system dynamically integrates external user profile data provided by the provider system with system-managed content in a delivered web page that is tailored to the user.

20 Claims, 13 Drawing Sheets

```
<? xml version="1.0" encoding="UTF-8"?>
<segment-config
    xmlns="http://www.vignette.com/xml.schemas/segment-config"
    xmlns:xsi="http://www.w3.org/XMLSchema-instance"
    xsi:schemaLocation= "http://www.company.com/xml.schemas/segment-config segment-config.xsd" >
    <segment name="Large Company">
        <condition value="#ProfilePro.employee_count > 3500"/>
    </segment>
    <segment name="Chrome">
        <condition value="#request.getHeader('user-agent') matches '.*Chrome. *' "/>
    </segment>
</segment-config>
```

Conditions

Specify one or more conditions to limit which content items can appear in the list.

[X] [Name ▼] [is ▼] [Custom expression ▼] [profile.ProfilePro.emp] [?]

[Add Condition]

Configuration Console > Subcomponents > Global Settings > Segment

CONFIGURATION Properties ⟋760

| | |
|---|---|
| Name | CONFIGURATION (?) |
| Path | /global/segment |
| Run Value | `<?xml version="1.0" encoding="UTF-8"?>`<br>`<segment-config`<br>`    xmlns="http://www.vignette.com/xmlschemas/segment-config"` |
| Default Value | `<?xml version="1.0" encoding="UTF-8"?>`<br>`<segment-config`<br>`    xmlns="http://www.vignette.com/xmlschemas/segment-config"` |
| Revert Value | `<?xml version="1.0" encoding="UTF-8"?>`<br>`<segment-config`<br>`    xmlns="http://www.vignette.com/xmlschemas/segment-config"` |
| Config Value | |

Reset   Browse..   No file selected.

Save   Cancel

```
-{
    "registry_company_name": "CondeNast Publications",
    "registry_city": "New York",
    "registry_state": "NY",
    "registry_zip_code": null,
    "registry_area_code": 212,
    "registry_dma_code": 501,
    "registry_country": "United States",
    "registry_country_code": "US",
    "registry_country_code3": "USA",
    "registry_latitude": 40.714298248291016,
    "registry_longitude": -74.00599670410156,
    "company_name": "Advance Magazine Publishers Inc",
    "demandbase_sid": 1334313,
    "industry": "Media & Entertainment",
    "sub_industry": "Publisher",
    "company_size": "Over $5B",
    "employee_count": 37200,
    "isp": false,
    "primary_sic": "2721",
    "street_address": "4 Times Sq Fl 22",
    "city": "New York",
    "state": "NY",
    "zip": "10036",
    "country": "US",
    "country_name": "United States",
    "phone": "212-286-2860",
    "latitude": 40.755,
    "longitude": -73.9842,
    "stock_ticker": null,
    "web_site": "condenast.com",
    "marketing_alias": "Advance Magazine Publishers",
    "fortune_1000": false,
    "forbes_2000": false,
    "annual_sales": 7737600000,
    "revenue_range": "Over $5B",
    "employee_range": "Enterprise",
    "b2b": true,
    "b2c": true,
    "traffic": "Medium",
    "hq_sid": 6179,
    "domestichq_sid": 6179,
    "worldhq_sid": 6179,
    "information_level": "Detailed",
    "audience": "Enterprise Business",
    "audience_segment": "Media & Entertainment",
    "ip": "208.92.40.133"
}
```

↙800

```
{
    "id": "123456789",
    "name": "John Doe",
  - "education": [
      - {
          - "school": {
                "id": "1020304050060708",
                "name": "National High School"
            },
          - "year": {
                "id": "1030507090020406",
                "name": "1980"
            },
            "type": "High School"
        },
      - {
          - "school": {
                "id": "13579246801",
                "name": "UMCP"
            },
          + "concentration": [1],
            "type": "College"
        },
      - {
          - "school": {
                "id": "123045607890321",
                "name": "Stanford"
            },
          + "year": { },
          + "concentration": [1],
            "type": "Graduate School"
        }
    ],
  - "work": [
      - {
          - "employer": {
                "id": "115043648511615",
                "name": "OpenText"
            },
          - "location": {
                "id": "107572595931951",
                "name": "Austin, Texas"
            },
          - "position": {
                "id": "131467993563051",
                "name": "Director of Product Management"
            },
            "start_date": "0000-00"
        },
      - {
          - "employer": {
                "id": "113897213765",
                "name": "Oracle"
            },
```

```
/**
 * Get the address from other profile attributes
 *
 * @return return the address of the form city, state zip
 */
public String getAddress( ) {
    return registry_city + ", " + registry_state + " " + registry_zip_code;
}
```
1010

```
/**
 * Get a random double
 *
 * @return a pseudo-random double from 0.0 and 1.0
 */
public double getRandomDouble( ) {
    return Math.random();
}
```
1020

SYSTEMS, METHODS AND COMPUTER PROGRAM PRODUCTS FOR DYNAMIC USER PROFILE ENRICHMENT AND DATA INTEGRATION

CROSS-REFERENCE TO RELATED APPLICATIONS

This is a conversion of, and claims a benefit of priority under 35 U.S.C. §119(e)(1) from U.S. Provisional Application No. 62/040,209, filed Aug. 21, 2014, entitled "USER PROFILE ENRICHMENT FRAMEWORK FOR ENHANCED WEB EXPERIENCES," which is incorporated herein by reference for all purposes. This application relates to U.S. patent application Ser. No. 14/812,473, filed Jul. 29, 2015, entitled "EXTENSIBLE PROVIDER CONNECTION SYSTEMS, METHODS AND ARCHITECTURE," which claims a benefit of priority from U.S. Provisional Application No. 62/030,507, filed Jul. 29, 2014, entitled "EXTENSIBLE PROVIDER CONNECTION SYSTEMS, METHODS AND ARCHITECTURE FOR SEAMLESS PROVIDER DATA INTEGRATION," both of which are incorporated herein by reference in their entireties. This application also relates to U.S. patent application Ser. No. 13/781,160, filed Feb. 28, 2013, entitled "WEBSITE IMPERSONATION SYSTEM AND METHOD," which is incorporated herein by reference for all purposes.

TECHNICAL FIELD

This disclosure relates generally to data integration. More particularly, various representative embodiments disclosed herein relate to systems, methods, and computer program products for implementing user profile enrichment frameworks for dynamically enriching and enhancing web experiences with utilization of external user profile data. Representative systems, methods, and computer program products are adapted to enrich and enhance web experiences without needing to store user profile data within the user profile enrichment framework and/or synchronize external user profile data with a provider system.

DESCRIPTION OF RELATED TECHNOLOGY

Enterprises are complex organizations that may employ long-lived software systems, such as Internet web sites, that are accessible through a web-tier by a potentially unlimited number of end users. Such software systems may also include content management systems configured to manage content items used by web sites.

Modern web sites must deliver an ever-increasing amount of dynamic web page content. Dynamic web page generation is a process where a server computer produces web page content just-in-time for delivery to a client computer (e.g., a web browser). Dynamic web pages differ from static web pages in that the content of a dynamic web page is determined when the web server computer receives a page request from a client computer.

Methods of creating documents from various source content have been conventionally described, e.g.:

U.S. Pat. No. 4,996,662, entitled "METHOD OF GENERATING DOCUMENT USING TABLES STORING POINTERS AND INDEXES," describes a document processing method that includes routines for controlling functions of a document manipulation system for manipulating documents.

U.S. Pat. No. 5,181,162, entitled "DOCUMENT MANAGEMENT AND PRODUCTION SYSTEM," discloses an object-oriented document management and production system in which documents are represented as collections of components that may be combined and mapped on a page-by-page layout.

U.S. Pat. No. 5,655,130, entitled "METHOD AND APPARATUS FOR DOCUMENT PRODUCTION USING COMMON DOCUMENT DATABASE," discloses a system for producing a variety of documents from a common document database. In the described system, source documents are decomposed into encapsulated data that includes content along with classifying information about the content. Encapsulated data elements are saved to a database and can later be reassembled to form variation-specific documents.

All of the above-described systems involve decomposition of source documents into smaller components, storing the components in a database and reassembling the components to form different versions of the source document or entirely new documents. While these systems facilitate the building of variation-specific documents, they are directed to combining and recombining static elements in various ways. The above-described systems do not provide solutions for generating a document that incorporates dynamically discovered information. Furthermore, these systems do not provide dynamically modifying documents to enrich or enhance their content as a function of dynamically discovered information contained in a user profile associated with a target audience of the document so modified.

Various other methods have been proposed for creating dynamic content in pages for delivery to a client over the Internet. For example, JAVA SERVER PAGES (Sun Microsystems, Inc. of Menlo Park Calif.) or ACTIVE SERVER PAGES (Microsoft Corporation of Redmond Wash.) create page content by having a web page's Java or C++ server code write all of the page content to the client browser via an output stream. A major failing of these solutions is that the server code and page design are both contained in the same hypertext markup language (HTML) file, making it difficult for anyone other than programmers to manage or modify the content on the pages.

Several issues arise when integrating managed objects with, e.g., user profile data from external repositories. Data (e.g., user profile data) used by conventional content management systems is also managed by the content management systems. To integrate data from external repositories into conventional content management systems (e.g., in order for enterprise users to use external user profile data on their web site) means that external data must be replicated, locally stored, and then synchronized with corresponding external repositories. This replicate-store-synchronize conventional approach to data integration is expensive, time-consuming, and complex.

As a specific example, an enterprise may have a content provider that is external and/or independent of the enterprise and that provides user profile data for use on the enterprise's web site. As may be readily appreciated, user profile data is distinctly different from web site content (e.g., images, web page text content, etc.) normally managed by conventional content management systems. For example, unlike images and web page text content, user profile data may change frequently. Further complicating the matter, the content provider may implement a proprietary program that tracks user profile data that is dynamically changing. Consequently, today's web content management systems continue to struggle with various issues relating to cost, complexity and efficiency involved with the management, integration, and delivery of dynamically rendered representations of external data, including user profile data.

SUMMARY OF DISCLOSURE

Embodiments disclosed herein provide new web content management and dynamic rendering solutions for user-profile-based enrichment and enhancement of web experiences that address deficiencies associated with conventional approaches. In particular, the solutions disclosed herein may be implemented via a browser-based computer tool, referred to as Web Experience Management (WEM), for building and editing dynamically rendered web experiences. WEM supports enterprise information platforms, languages, devices, and rich media requirements. WEM also provides in-context editing of dynamically generated web pages where enterprise content may be pulled from content repositories and/or locations within/external to an enterprise. To manage enterprise content (also referred to as "managed assets," or "managed objects"), representatively disclosed WEM systems include features for authorized users to manipulate, tailor, and publish managed objects to a web site, an internal site (e.g., an intranet), or a user-facing web site, such as a newspaper or ecommerce site, etc.

WEM is built for high-volume, transaction-oriented web applications and can transform online transactions into actionable strategic insight through innovative features such as segmentation and targeting. A WEM user can select specific page components, create targeting rules for a page component, enable component targeting rules, and use a profile preview within in-context edit. In this way, compelling web experiences can be created to target specific visitor segments. WEM users (e.g., page authors) can switch between end user profiles to see how content displays to a particular audience. The segmentation rules can be built using public segments (e.g., user profiles on a social networking site) or segments defined a customer's unique segmentation data.

In some embodiments, such user profiles can be enriched with external user profile data from one or more provider systems through a user profile enrichment framework of a web experience management system. In some embodiments, a method for external user profile integration may include establishing, through the user profile enrichment framework, a provider connection between the web experience management system running on one or more server machines and a provider system external to the web experience management system. The provider connection may connect a page component of a network site and a provider service executing on the provider system. Responsive to a request for a page containing the page component, the web experience management system may query, via the provider connection, the provider service about a user accessing the network site. The web experience management system may receive, via the provider connection, a response from the provider service. The response may include external user profile data for the user accessing the network site. A user profile object may be generated using the external user profile data. The user profile object may be communicated to a segmentation and targeting engine for determining and delivering content tailored to the user based on the external user profile data from the provider system. In this way, the network site may provide the user with enhanced web experiences. Since the external user profile data is integrated at a delivery stage, neither the network site nor the web experience management system needs to store the external user profile data and/or synchronize the external user profile data with the provider system(s).

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible. It should be noted and as it will become readily clear to those skilled in the art from the descriptions herein, the inventive subject matter represents and involves significant advancements to computer operations and functionality over the conventional art in the field of data integration and the practical applications found therein, including increased efficiencies, time-saving mechanisms, and improvements in interactions, data integration and presentation, user experience, and functional capacities. In some instances, for example, the inventive subject matter reduces memory and storage needs, can reduce and/or simplify infrastructure requirements and the resulting maintenance and update thereof, such as the network infrastructure, and/or can increase access and response times to data integration requests and other computer operations.

These and other aspects of the disclosure will be better appreciated and understood when considered in conjunction with the following description and the accompanying drawings. It should be understood, however, that the following description, while indicating various representative embodiments of the disclosure and numerous specific details thereof, is given by way of illustration and not limitation. Many substitutions, modifications, additions and/or rearrangements may be made within the scope of the disclosure without departing from the spirit thereof, and the disclosure herein contemplates and includes all such substitutions, modifications, additions and/or rearrangements.

BRIEF DESCRIPTION OF THE DRAWINGS

The drawings accompanying and forming part of this specification are included to representatively illustrate certain aspects of various embodiments. A clearer impression of the disclosed subject matter, and of the components and operation of systems provided with the disclosed subject matter, will become more readily apparent by referring to the representative, and therefore non-limiting, embodiments illustrated in the drawings, wherein identical reference numerals designate the same components. Features illustrated in the drawings are not necessarily drawn to scale.

FIG. 5 depicts an example of segment configuration code that demonstrates how external user profile data may be accessed in accordance with a representative embodiment disclosed herein;

FIG. 6 depicts a diagrammatic representation of an example of a user interface illustrating how external user profile data may be accessed in accordance with a representative embodiment disclosed herein;

FIG. 7B depicts a diagrammatic representation of a user interface of a configuration console showing one example of segment configuration with sample configuration properties in accordance with a representative embodiment disclosed herein;

FIG. 8 is an example of a user profile fetched from a third-party user profile service provider in accordance with a representative embodiment disclosed herein;

FIG. 9 is another example of a user profile fetched from a third-party user profile service provider in accordance with a representative embodiment disclosed herein;

FIG. 10 is an example of adding an address constructed from user profile attributes, and a random number to simulate that a user could add arbitrary data, in accordance with a representative embodiment disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
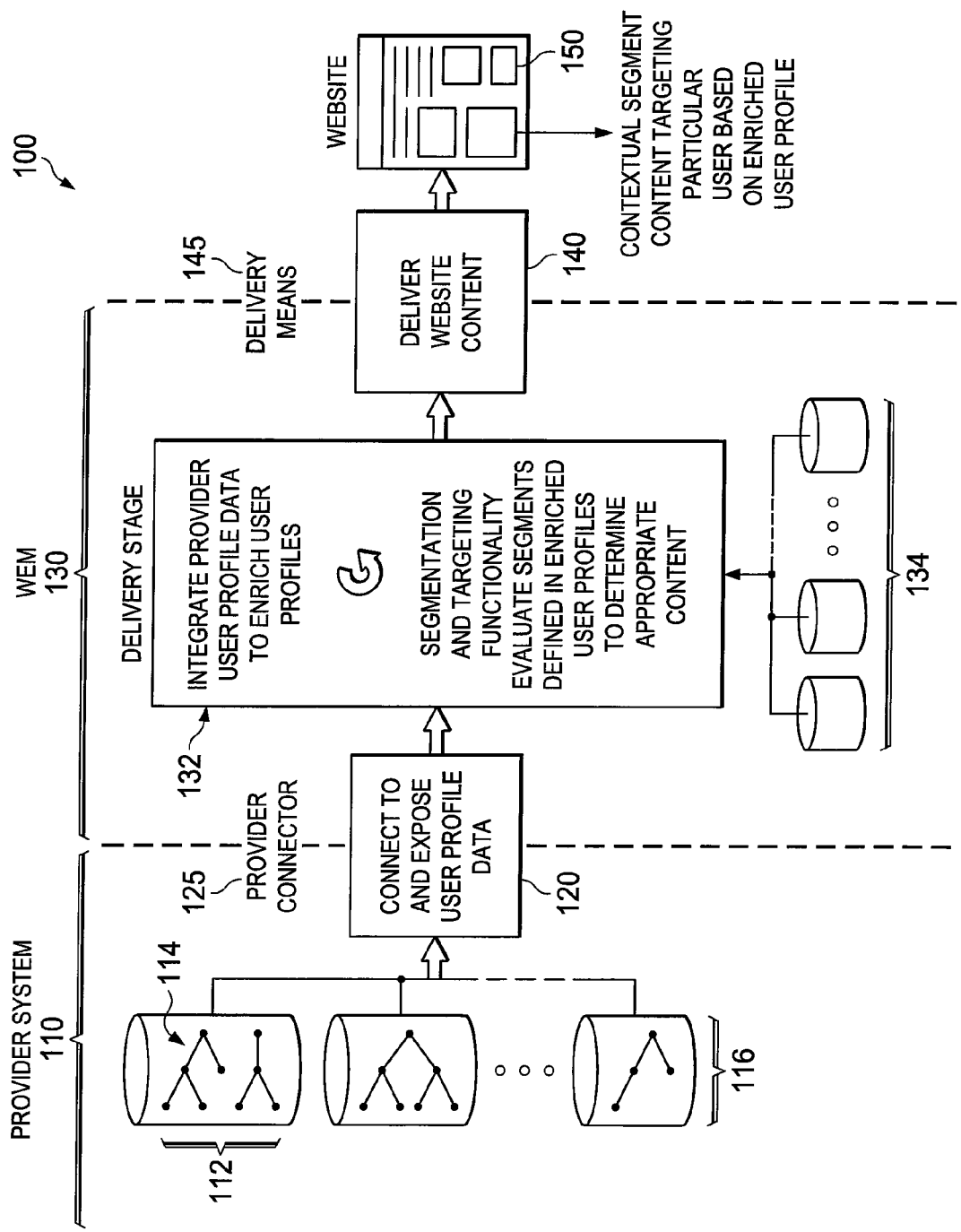
FIG. 1 depicts a functional diagram illustrating an example of a web site having external user profile data and managed contextual segment content in accordance with a representative embodiment disclosed herein.

FIG. 1 depicts a functional diagram illustrating an example of a system 100 having provider data 116 and managed content 134 according to various representative embodiments disclosed herein. As generally depicted in FIG. 1, provider data 116 may comprise native representations 112 of content objects 114 native to a provider system 110 that is external to web experience management (WEM) system 130. WEM system 130 may have a management stage and a delivery stage. Moving WEM-managed content from the management stage to the delivery stage may be referred to as "publishing"; however, external content (e.g., provider data 116), which is not managed by WEM, is not "published" in this sense. Rather, external content is accessed and integrated by the WEM system in the delivery stage directly for the dynamic generation of web page 150.

Specifically, external items are obtained dynamically, as needed, at the delivery stage (i.e., at runtime) by connection to and exposure of 120 external provider data 116 via provider connector 125. Notwithstanding the preceding, external items appear in the web content management ontology as if they were local components of the web site. That is to say that the presentation assets, including: any WEM-managed "enriched" content objects (see 132); any templates, regions, components, and/or the like (see 132); any metadata associated with content or content objects; and any external content objects 114, are published from the management state to the delivery stage or WEM. Published managed objects, in accordance with various representative aspects disclosed herein, allow a web site to connect to and expose 120 provider data 116, and to integrate/interact with/manage/enrich 132 external content dynamically at the delivery stage to deliver 140 web site content 150 via delivery means 145 without the need to copy or synchronize external provider data 116 within the WEM system 130 itself.

As those skilled in the art can appreciate, while user profile data may be thought of external content (as being any data external from WEM), a user profile provider is distinguishable from an external content provider in terms of implementing the interfaces. While similar and both pluggable providers, they are distinct as defined by their respective interfaces and a user profile provider is not required to implement both sets of interfaces.

Figure 2:
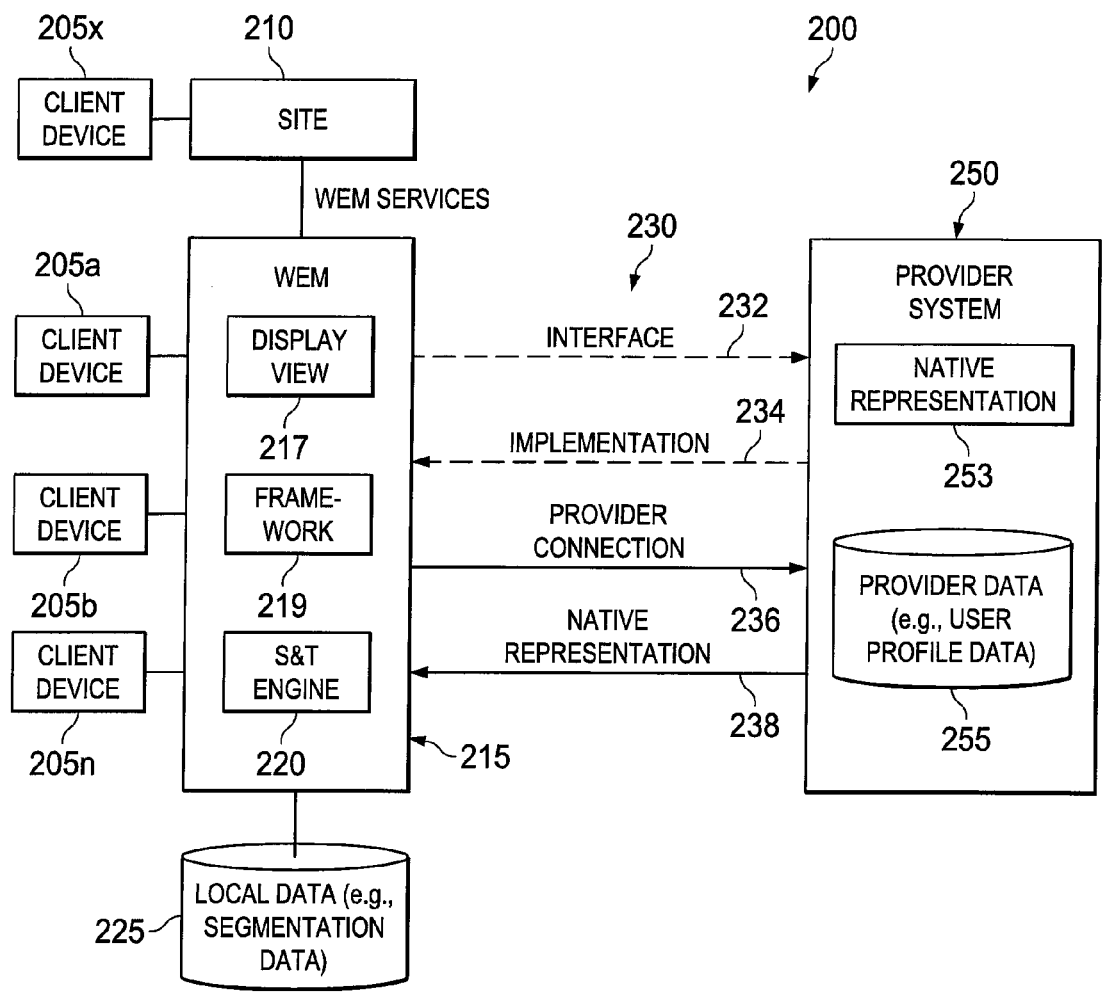
FIG. 2 depicts a diagrammatic representation of one example of a system for seamless external user profile integration with managed content in accordance with a representative embodiment disclosed herein.

To this end, FIG. 2 illustrates a diagrammatic view of a system 200 for seamless, dynamic integration of provider data 255 with managed content in accordance with various representative embodiments disclosed herein. System 200 may comprise WEM 215 running on one or more server machines communicatively connected to client devices 205a, 205b, 205x, ..., 205n over a network, such as, e.g., a private network of an enterprise. In various representative embodiments, WEM 215 may be implemented as a browser-based tool for building and editing web experiences for site 210 via WEM services. WEM services may include WEM presentation services, such as, e.g., templates and page definitions, and/or the like. In a representative aspect, site 210 may be owned and operated by the enterprise. WEM 215 may support enterprise information platforms, languages, devices, and various rich media requirements. WEM 215 may also provide in-context editing of web pages. Display view 217 of WEM 215 may allow a user at a client device to access and view managed content stored in local data store 225. Managed content may comprise digital assets owned by the enterprise. Although site 210 may be representatively depicted outside of WEM services, users interacting with external content (e.g., client device 205x) may do so in a preview mode provided by WEM 215 within the context of site 210.

As described above, WEM 215 may be embodied on one or more server machines operating in a network environment. A suitable server machine may comprise a data processing system having one or more central processing units (CPU) or processors coupled to one or more user input/output (I/O) devices and memory devices. Examples of representative I/O devices may include, but are not limited to, keyboards, displays, monitors, touch screens, printers, electronic pointing devices such as mice, trackballs, styluses, touch pads, or the like. Examples of memory devices may include, but are not limited to, hard drives (HDs), magnetic disk drives, optical disk drives, magnetic cassettes, tape drives, flash memory cards, random access memories (RAMs), read-only memories (ROMs), smart cards, etc. Such a data processing system may be coupled to a display, an information device, and various peripheral devices such as printers, plotters, speakers, etc. through appropriate I/O devices. Furthermore, such a data processing system may also be coupled to external computers or other devices through network interface(s), wireless transceiver (s), or other communication means coupled to a network, such as a local area network (LAN), wide area network (WAN), or the Internet. Other communication implementations are also possible.

In various representative embodiments, WEM 215 may further comprise a framework. In some embodiments, the framework may comprise pluggable provider framework 219. In some embodiments, pluggable provider framework 219 may implement a user profile enrichment framework. Segmentation and targeting engine 220 may utilize the user profile enrichment framework to target specific visitor segments, as explained below. In some embodiments, the user profile enrichment framework may reside on a server machine referred to as a user profile enrichment computer.

In some embodiments, WEM 215 may be communicatively connected to provider system 250 via communication means 230. Provider system 250 may comprise provider data 255 stored in a provider data store external to WEM 215. Provider data 255 stored in the provider data store may comprise native representation(s) 253 native to provider system 250.

In some embodiments, pluggable provider interface 232 (also referred to herein as "WEM interface") may be provided to provider system 250. In representative embodiments, WEM interface 232 may be provided as an SDK (software development kit), including, e.g., Javadoc and JARs (i.e., files in Java ARchive format) of compiled Java classes. Javadoc is a documentation generator for generating application-programming interface (API) documentation in HTML format from Java source code and is known to those skilled in the art. Those skilled in the art will appreciate that a plurality of pluggable provider interfaces may be presented to multiple provider systems. Accordingly, FIG. 2 is exemplary and not limited to a single pluggable provider interface and/or a single provider system.

In some embodiments, provider system 250 may provide implementation 234 of pluggable provider interface 232. Implementation 234 may consist of Java classes of pluggable provider interface 232. Implementation 234 may be configured into pluggable provider framework 219 as a provider representing provider system 250. In various representative embodiments, such an implementation may be manually added (i.e., deployed) to WEM as a JAR file using WEM configuration services. The provider framework is "pluggable" in the sense that service provider organizations can declare and configure an implementation of a provider interface that implements WEM provider framework interfaces and has some set of required properties for proper functioning. This can be done dynamically, meaning that service provider organizations or the like can obtain or be provided with a set of WEM provider framework interfaces and, substantially independently, a party can develop an implementation of a provider interface that implements one or more of the provided WEM provider framework interfaces. Organizations can provide the implementation to WEM that is then configured into the provider framework. Although a provider is configured in WEM, the configuration step can occur at any time after WEM installation. For example, a party can implement a provider and configure (or register) it with WEM (e.g., via a configuration console provided by WEM, as described later herein).

Implementation 234 of pluggable provider interface 232 may contain properties specific to provider system 250 or to the type of provider represented by provider system 250. As part of one of these properties, the implementation may indicate certain behaviors. For instance, the implementation may indicate when a content object may be handed back from a provider repository to a display view of WEM, what the object type of a content object is, etc. An object handed back from a provider repository need not be a WEM object and can be a custom created object; e.g., a JavaBean, a JSON string, or any other solution. It does not matter to WEM what that object looks like or what it contains, as long as it can be represented in Java so it can be handed to display view 217.

Upon implementation 234 of pluggable provider interface 232 being configured into pluggable provider framework 219, behaviors can be discovered by pluggable provider framework 219. This discovery process may be automatic and/or dynamic. The automatic/dynamic discovery of provider implementation behaviors occurs within WEM 215 upon instantiation of the provider implementation classes, at which point their behaviors are determined based on the set of pluggable interfaces they implement. Not all provider implementations may implement all interfaces. For instance, a provider may or may not implement an interface that is session oriented. If so, WEM can automatically provide a session-based caching of the provider's serializable "Context," declared as part of that interface. In some embodiments, WEM may cache the context at a location that is local to WEM. The cached context can be inserted into one or more subsequent requests for the user session.

Based at least in part on the behaviors supported by the particular implementation 234 of pluggable provider interface 232 (specific to provider system 250 in the example of FIG. 2), pluggable provider framework 219 may operate to create provider connection 236. Once provider connection 236 is established between WEM 215 and provider system 250, provider data 255 stored in a data store of provider system 250 can be accessed via provider connection 236 and represented in display view 217 so that they can be seamlessly and dynamically integrated with managed content stored in local data store 225. A page containing both the non-WEM-managed provider data and the WEM-managed content may be an example of such seamless, dynamic integration.

This seamless integration of non-WEM managed content and WEM managed content can have many uses. For example, some embodiments can integrate external content not managed by WEM at the backend where web experiences are built and edited via WEM services. Such web experiences can be delivered to web users at the frontend via external facing website(s). The seamless integration of non-WEM managed content and WEM managed content is transparent to the web users. From their perspective, there is no difference in their web experiences whether they are interacting with non-WEM managed content or WEM managed content.

Figure 3A:
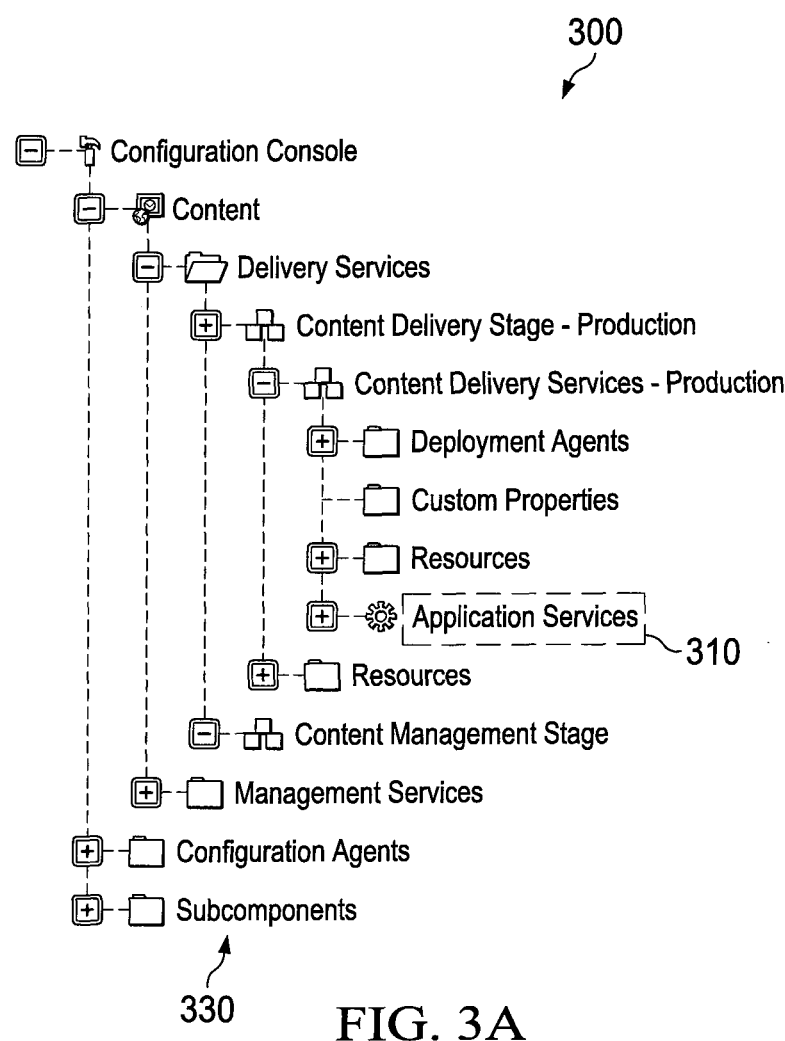
FIG. 3A depicts a diagrammatic representation of a WEM user interface showing one example of provider configuration in accordance with a representative embodiment disclosed herein.
Figure 3B:
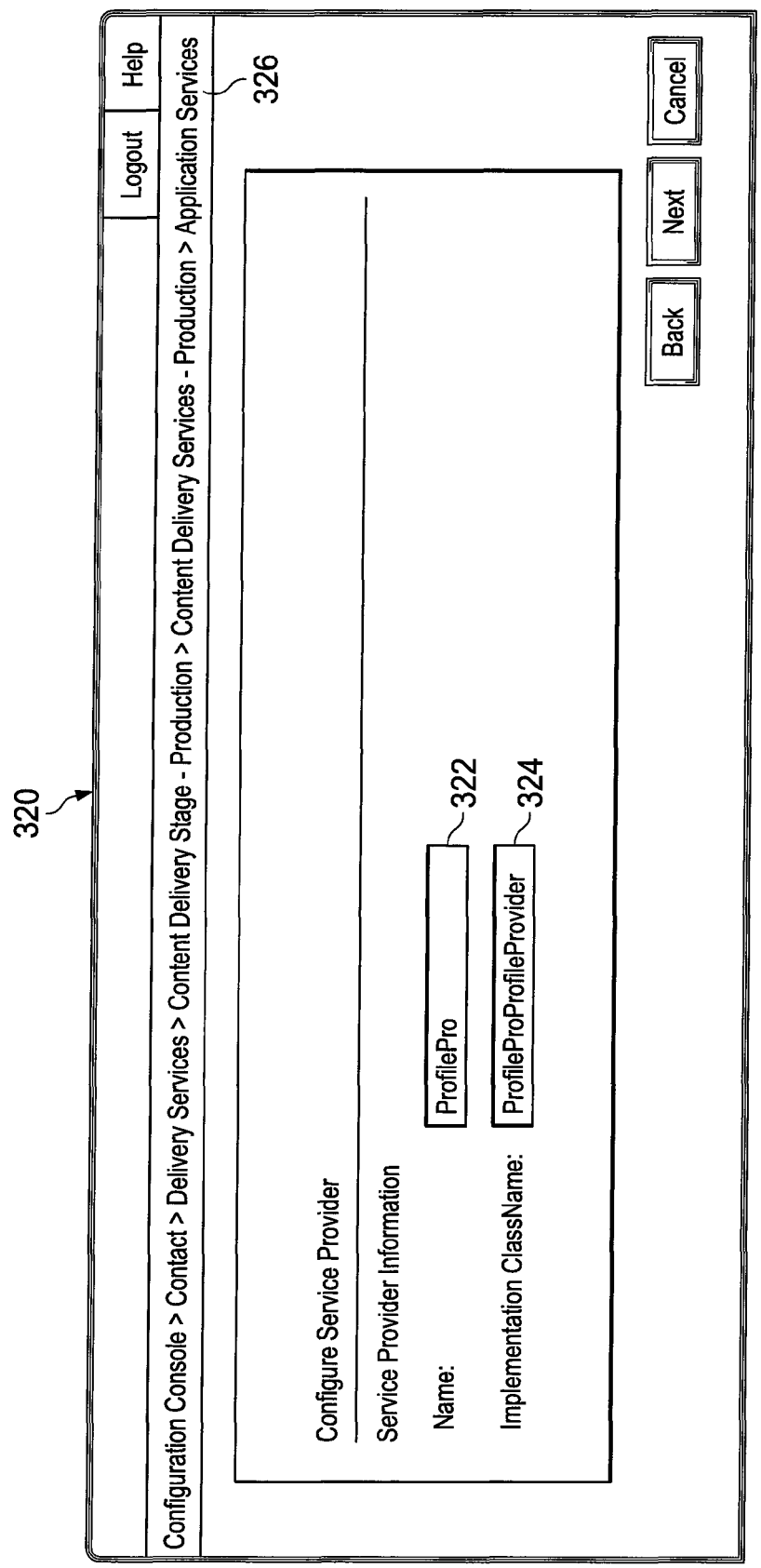
FIG. 3B depicts a diagrammatic representation of a WEM user interface showing one example of provider configuration in accordance with a representative embodiment disclosed herein.

At the backend, when a WEM user is building and editing web experiences via WEM services, they can choose various provider data from non-WEM provider(s) connected to WEM via provider connection(s) established as described above. FIG. 3A depicts a diagrammatic representation of a WEM user interface showing one example of provider configuration according to some embodiments disclosed herein. WEM (e.g., WEM 215 shown in FIG. 2) may provide configuration console 300 having application services 310 and subcomponents 330. As illustrated in FIG. 3B, application services 310 may include user interface 320 through which name 322 and implementation class 324 for a provider (e.g., "ProfilePro") can be provided in configuring a delivery stage 326.

Figure 4:
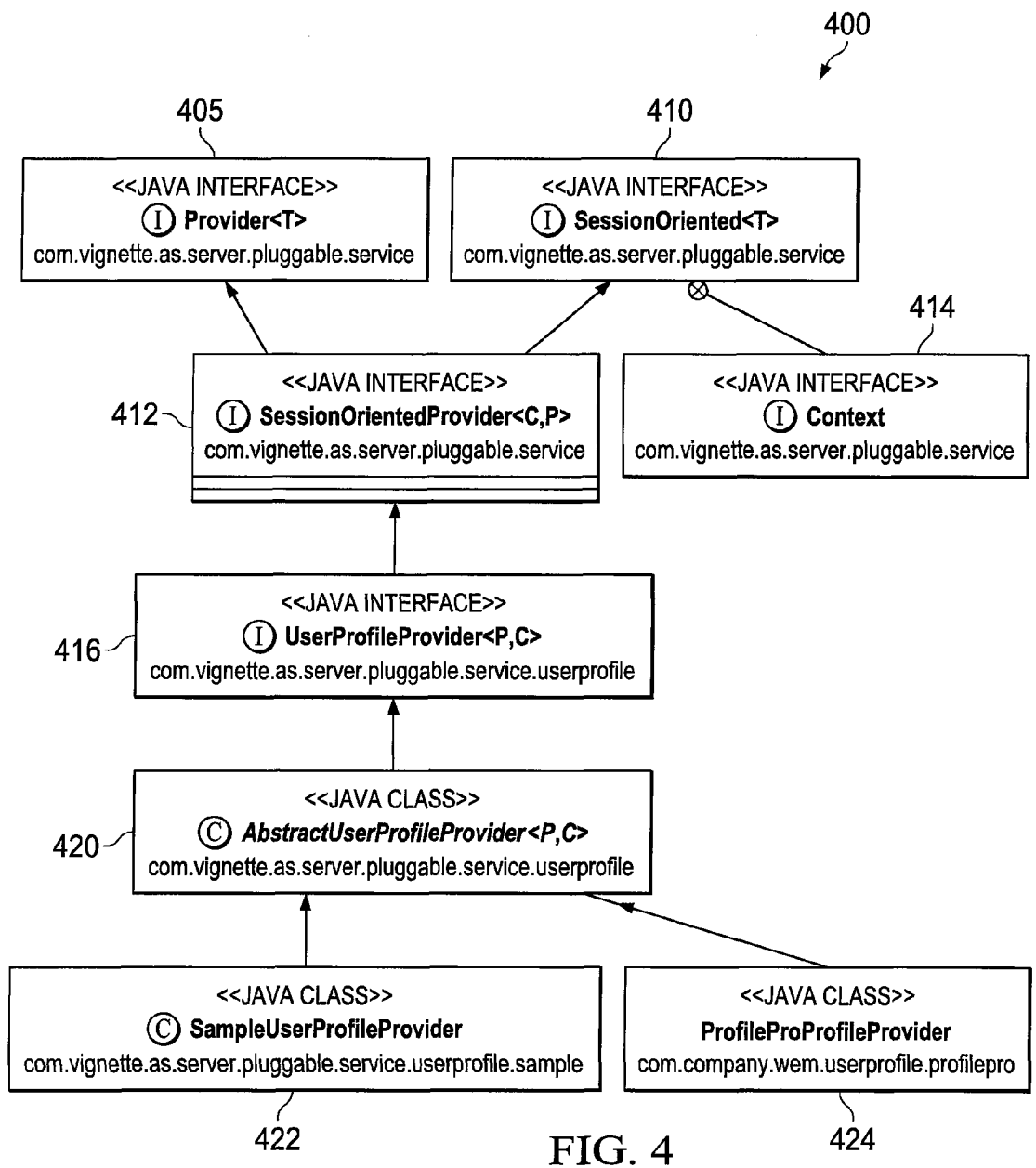
FIG. 4 depicts a graphical summary of user profile and pluggable provider interfaces in accordance with a representative embodiment disclosed herein.

FIG. 4 depicts a graphical summary of user profile and pluggable provider interfaces 400 in accordance with a representative embodiment disclosed herein. From the perspective of WEM, a "provider" is an implementation of a provider interface described above that will communicate with an external repository and that will present an application programming interface (API) that WEM can use (i.e., an WEM API). From a system perspective, therefore, a provider comprises, in some embodiments, Java interfaces that are implemented as a piece of code that runs inside of server machine(s) embodying WEM independent of an external repository and that communicate with the external repository to access provider data stored on the external repository.

As those skilled in the art can appreciate, an interface in the Java programming language is an abstract type that is used to specify an interface (in the generic sense of the term) that classes must implement. Java interfaces cannot be instantiated. Rather, they are implemented. Java interfaces do not contain method implementations and may only contain method signature and constant declarations. Thus, a class that implements an interface must implement all of the methods described in the interface, or be an abstract class (see, e.g., class 420). In the example of FIG. 4, user profile and pluggable provider interfaces 400 include Java interfaces 405, 410, 412, 414, 416 and Java abstract class 420 which implements interface 416. As illustrated in FIG. 4, different content providers such as "SampleUser" and "ProfilePro" can have different implementations of Java interfaces (e.g., Java classes 422 and 424, respectively) provided by an operator of WEM.

As those skilled in the art can also appreciate, it is unusual to integrate two or more different systems owned and operated by two or more different entities. Although it may be possible to build a one-off integration of two distinct systems, the resulting system cannot be integrated with other providers after it is built and deployed (i.e., made available on the market). The pluggable provider framework disclosed herein provides a meta layer of interfaces for WEM. Any system that can be characterized through provider interfaces in how the system is to be exposed to WEM users can be added (plugged into the provider framework) as a provider. This extensibility advantageously allows aftermarket integration of WEM with external sources.

To characterize a system (e.g., a provider repository), arbitrary types may be defined in an implementation to associate with any given item or node. Such types are what provide integration to some aspects of WEM's presentation framework.

Within WEM, a piece of content (i.e., managed content that is local to WEM) is described by a content type which describes the structure of the data. WEM users can define different page templates in WEM that might correspond better for a given structure, e.g., content type A may have a first kind of page template, content type B may have a second type of page template, etc. In some embodiments, this feature is extended to the external content by virtue of a string-type field in an implementation. As discussed above, different content providers can have different implementations of Java interfaces provided by an operator of WEM. An implementation can implement the minimum amount of touch points (also referred to herein as "jump off points" or "navigation mount point") through which a file system of a provider repository can be explored. The implementation may define a containment and items/folders of the file system and may describe how to navigate the file system, for instance, what is the root node, how to access a leaf node, etc. WEM does not need to know the structure of each piece of provider data in the provider repository. It just needs to know what type an item that piece of provider data is so a proper template can be selected. In this way, a WEM user can build a website to incorporate provider data from external repositories, declare how data is to be exposed (e.g., via beans), and WEM can bring that provider data in and expose a native way to interact with the data.

In some embodiments, a WEM user may access a provider system via a provider connection (e.g., provider system 250 and provider connection 236 shown in FIG. 2). Instead of retrieving actual provider data, native representation(s) (e.g., native representation 238 shown in FIG. 2) of the actual provider data may be obtained using method(s) implementing the particular behaviors specified by the provider system. The native representation(s) may be displayed in a display view (e.g., display view 217 shown in FIG. 2). In this way, user-definable objects (e.g., any Java object) can be passed back from a provider system external to WEM and displayed in a display view of WEM. Such a display view may be provided to the WEM user via a browser-based application executing on a client device. Through the native representation(s) of the provider data displayed in the display view, the WEM user can generate page fragment(s) representing the provider data, which resides at the provider system and which is not managed by the WEM. In some embodiments, such page fragment(s) may be in HyperText Markup Language (HTML). The page fragment(s) thus generated can optionally be cached, for instance, at a data storage location local to the WEM, and managed by the WEM in the same manner as content managed by the WEM.

Those skilled in the art will appreciate that provider data may have various representations. In some embodiments, a native representation may comprise a Java bean which encapsulates a plurality of objects into a single object. The plurality of objects may be presented in the display view via WEM presentation services without manipulation of the Java bean. In some embodiments, a native representation may comprise a JSON string. The JSON string may consist of attribute-value pairs. The attribute-value pairs may be presented in the display view via WEM presentation services without manipulation of the JSON string.

A website containing non-WEM managed content integrated with WEM managed content as described above may be referred to as a hybrid site. The hierarchy of a hybrid site can be illustrated from a physical perspective and a logical perspective. A hybrid site has local content (managed objects) and external content (non-WEM managed, external items). However, for each distinct object in a provider system, there is not an analogous object in WEM. The exemplary hybrid site hierarchy shows managed objects and jump off points to external items. Each jump off point in the exemplary hybrid site hierarchy is a node having an external content connection type. A provider connection gives WEM information about where to go to get an item and from what provider. It can fetch this object and all the data necessary from the provider's repository and surface that external content via presentation services in the same way as local content within WEM.

A content type is a description of a particular object and its attributes and properties. For example, a story content type has attributes such as title, body, name, etc., and there can have multiple instances of this type. Likewise, a provider connection has certain attributes such as title, mount path, provider, etc. An external content connection type defines what attributes do instances of that content type have and describes the data that it needs. However, this external content connection type is a system content type and WEM users are not expected to define the structure of and/or instantiate or change system content types. They just create instances of a provider connection object having the external content connection type, each pointing to a starting point at a provider system external to WEM and each describes how to present non-WEM managed content within WEM.

Specifically, to create a node, an instance of an external content connection type is created and placed in a site tree with other pieces of content or channels. When a user navigates to the node (a jump off point), the user can start to navigate a provider system. The provider connection (an instance of an external content connection type for the provider system) provides the user with the location where the external content is to be pulled from the provider system. Note that the provider system may not wish to expose their entire repository, so the provider connection may specify a root node for a portion of the provider's repository such as a particular branch of a provider's site hierarchy, file system, or the like. To this end, the node may represent a micro-site within the provider's site.

A local object managed by WEM and an external item managed by an external source need not have any similarities between them. As discussed, a WEM managed object is described by content type, including all of its attributes and types of data described in it. However, WEM need not have specific knowledge about a non-WEM managed object residing at a provider system (e.g., an external item stored and managed by an external content provider). Although WEM may require some support mechanisms, such as bookkeeping information provided at the interface (e.g., is this external item a single item or is it a type of thing like a container that can contain other objects, etc.), it does not put any constraints on the provider system where the non-WEM managed object resides. To WEM, the provider system just needs to identify this non-WEM managed object and distinguish between two classifications of objects (e.g., an item or a folder) through the pluggable provider framework.

As a specific example, a provider system (e.g., a content repository or information system) external to WEM may have and manage a product database. Each product in their product database may have a picture, a description, metadata about the product such as price, etc. When a user of WEM logs into WEM, they will not see in a WEM database a WEM managed object that contains any information about this product (which is managed by the external provider system). Instead, the presentation of the product through WEM is all done dynamically.

As described above, WEM may cache information once page fragments are generated; however, WEM does not store and/or manage an object which represents this particular product. Rather, WEM has a mandatory object that the provider system must have (i.e., a provider connection, referred to herein as an external content connection in some embodiments). The provider connection, which is generated based on the provider's implementation of a provider interface, provides sufficient information to retrieve the object representing the particular product. That is, when someone tries to get to this product by providing or selecting an identifier (ID) corresponding to the product, the provider connection can get the entire object representing the particular product and pull it back dynamically at runtime. In some embodiments, WEM may manage such product IDs through URLs and some fields in a WEM database. This allows WEM to integrate external content/information managed by external provider systems such as external repositories without having to duplicate and/or manage the external content/information. WEM also does not have to manage auxiliary objects for every item (e.g., a product) that is external to WEM. Again, WEM just needs to know what external type an item of provider data is so a proper template can be selected.

The ability to access and retrieve non-WEM managed objects dynamically via provider connections to provider systems allows for seamless integration of external content with internal presentation services provided by WEM. WEM has a rich set of features for building websites—what they look like, page templates, all the caching involved, regions, components, etc. To utilize this presentation model, WEM provides a minimum number of touch points (which, in some embodiments, are also referred to as jump off points, mount paths, nodes, etc.) necessary for someone to build a website using all those rich features of WEM but data comes from somewhere else. Each touch point has an appropriate provider connection associated therewith. For example, if a touch point is for a searchable provider (which is defined at the interface given the provider class), its provider connection is characterized with salient aspects of searching—what does it mean to search something—such that a WEM user has the ability to perform searches of an external provider system via the provider connection and can navigate the external provider system as described in the interface (e.g., navigate by traversing a hierarchical structure where a node may contain a sub node or navigate to an item by random access with a given ID of the item). Unlike querying a database, it's not just content (e.g., a record) that gets returned via a provider connection. The provider connection can also get metadata about the content and the metadata also gets integrated with the presentation in WEM.

The mechanism by which external content can be obtained using a provider connection can be very flexible. Each provider connection may depend entirely on the implementation of each particular provider system. Different provider systems can implement very different provider connections. As an example, an external content provider may have an implementation where their content (which is external to WEM) is accessible via RESTFUL type of API over HTTP (REpresentational State Transfer (REST) is a stateless architecture that generally runs over HTTP) and another external content provider may have a file based implementation where access is performed using a file system and data descriptions are pulled via eXtensible Markup Language (XML) files. Another provider system may do this over File Transfer Protocol (FTP), etc. These communications technologies are known to those skilled in the art and thus are not further described herein. Given that WEM can communicate (using whatever appropriate communications technology) with an external source which implements WEM interfaces, WEM can readily obtain, for instance, the name of an object and the type of the object. Thus, to WEM, it matters not how a non-WEM managed object is stored or managed by an external source so long as the external source implements the interfaces (means) through which a Java call can be made so that WEM can get its name, its subtype, determine if it is a node or an item, etc. and present it in a display view.

Such provider connections also allow WEM users to continue to use external information systems which they may already be using or with which they may be familiar. WEM does not interfere how users perform their duties. This means that when a new provider system is added to WEM via the pluggable provider framework, there may be nothing new to learn for those who had been and/or have knowledge of using that provider system. For example, some users may already know what their objects look like, how to use APIs to communicate with that provider system, what properties their objects may have, etc. They can continue to use those APIs and objects via the provider connection to the particular provider system. For example, the provider connection can provide a connection to an object residing at the provider system and hands back a native representation of the object to a user via a display view (a piece of HTML for displaying that object). The user can then use that third-party API (the provider system's API that the user is already familiar with) in order to access the object.

Conventional integration approaches do not allow such preservation of third-party APIs and/or passage of native representations from another system. Most integration approaches either import all the data, take over the imported data and make it look like internal data—this requires duplication, synchronization, storage, resources, etc. Or, they make small wrapper type objects over the external data using a delegation model, which allows access to an object through the use of proprietary, internally defined APIs. This requires a user to learn and use new data model and new APIs.

The seamless integration approach disclosed herein does not require a user of WEM to learn and use new data model and new APIs in order to use non-WEM managed content in building and/or editing web experiences. Take, for example, the aforementioned product database managed by an external content repository. To manage products in the product database, they may define a schema for storing Stock Keeping Units (SKUs), images, product descriptions, etc. Depending upon product types, the schema may specify different types of information. Users (e.g., software developers) who use this product database are familiar with their API. The external content repository can build an adapter (e.g., via a software development kit (SDK) from WEM) that will pass through a native representation (e.g., a Java bean, a JSON string, etc.) to WEM so their software developers can continue to write JSP code (JavaServer Pages (JSP) is a technology that helps software developers create dynamically generated web pages based on HTML, XML, or other document types) using their prior knowledge (and/or existing domain expertise) to build their site using WEM. No need to build wrapper objects or learn a new schema, etc. With the pluggable provider framework disclosed herein, even though the schema defined by the external content repository is completely opaque to WEM, WEM can surface non-WEM managed content via WEM's presentation services just like WEM managed content.

WEM's presentation services can manifest as an object model which has page templates. A page template may be an instance of a WEM ContentType. The rendering of a page template would result in an HTML document. For example, a template may have certain regions and each region may have certain components. Each template has data that describes the layout, links (e.g., URLs), and other aspects of the page. For example, within a lower level of components, there can be an image or a body of a story. One piece of that component has a display view, which is a type of object in the system that can read an object and, from that object, produce/generate some HTML code (a fragment), and then show it on a page. Previously, this is limited to WEM managed content (local to WEM). With the seamless integration approach disclosed herein, a provider connection can provide a WEM user with a connection to non-WEM managed content of a provider system (external to WEM), hand them back and display within the display view an object that is in a native representation (e.g., a bean) so that they can write their own code (as before, using their native APIs) to control how they want their website to look and feel. This allows WEM users to construct their website(s) using WEM, down to the granular level that they can interact with external sources (e.g., third-party content providers) just as before, but now seamlessly integrated with local content managed by WEM.

Specifically, within a display view, a WEM user can interact with non-WEM managed objects at an external source using APIs that are native to the external source. Through the provider implementation in the pluggable provider framework, a WEM user can choose what that object looks like on a website using an API that is native to the external source, a custom API that the user wrote, or some other API—such as one for an elastic cloud.

This is all part of the pluggable provider framework and the behaviors of each implementation depends on what properties and what controls each implementation has when a provider connection is implemented. WEM performs the management of identifying and accessing non-WEM managed content, giving WEM users the ability to write code to interact with non-WEM managed content, generating a fragment containing the code, and optionally caching it. It is a seamless way to abstract what types of objects WEM is dealing with at the presentation layer, regardless of whether they are external content of any type or internal content. Furthermore, because third-party APIs can be preserved, WEM users are provided with the opportunity to use whatever APIs they are familiar with and/or that suit their needs.

Using presentation services along with external content allows WEM to enrich any external content that is brought into WEM. That is, in addition to disbursing external items throughout a website that a WEM user is developing or editing, the WEM user can add additional information for any particular external item. For example, in addition to the price, description, and images of a product (which, as described in the above example, is managed by a provider system), a WEM user can add reviews, rankings, and comments. WEM manages the additional information generated this way which is in free form and which can be in any content type they want (e.g., the WEM user may call it "my type"—it does not matter to WEM). There is no need to associate these items with the external item. For each type of external item, a WEM user can define a content type in WEM that they want to use to enrich that type of external item. Accordingly, in some embodiments, a method for seamless provider data integration with managed content may further comprise providing a user interface for enriching the provider data.

Furthermore, any managed content can be enriched with external content that is brought into WEM. For example, WEM provides segmentation and targeting tools for WEM users to create page components that target specific visitor segments (e.g., via segmentation and targeting engine 220 of FIG. 2). More specifically, a WEM user can select page components, create targeting rules for a page component, enable component targeting rules, and use a profile preview within in-context edit. The WEM user can switch between end user profiles to see how content displays to a particular audience. The segmentation rules can be built using public segments (e.g., user profiles on a social networking site) or segments defined a customer's unique segmentation data. As described above, WEM can add these external systems (e.g., the social networking site, the customer's system, third party service providers, etc.) as providers.

In some embodiments, an external system may be added to WEM as a segment provider or a service provider. This can be done using a configuration console (e.g., configuration console 300 of FIG. 3). In some cases, there is no need to restart WEM for a configuration change to take effect. That is, WEM configuration services support changing variables without restarting. Any provider (including a user profile provider) can be implemented to take advantage of this functionality.

In some embodiments, a user profile segmentation provider may implement a particular Java Interface (e.g., UserProfileProvider 416 shown in FIG. 4). Once configured into the pluggable provider framework (e.g., pluggable provider framework 219 of FIG. 2), a user profile segmentation provider can read user profile data and evaluate segments using profile data fetched from a corresponding provider system (e.g., provider system 250 of FIG. 2). As those skilled in the art can appreciate, a user profile provider need not be an external content provider in terms of implementing the interfaces.

In some embodiments, WEM provides a segmentation and targeting engine (e.g., segmentation and targeting engine 220 of FIG. 2) for targeting specific visitor segments using user profile information that may be completely external to WEM which is previously very difficult if not impossible. Instead of relying on properties about a website visitor, WEM users can construct segments and apply segmentation rules to control when a type of end user visits a site, provide a particular segment based on the segmentation rules. The user types are tightly coupled with the segments. However, page authors are not necessarily user profile experts and user profile providers are not experts in writing such segments. The extensibility of WEM advantageously allows for a seamless integration of expertise from these very different fields. As such, WEM users can further define segments and use the segmentation and targeting engine to deliver content based on user profiles from any sort of external user profile providers. Such external user profile providers may provide information about an end user that is previously not available via a user-agent of a browser running on the end user's device (e.g., the user's geo-location, what company they work for, etc., company size, what industry they are in, etc.).

The enriched end user profile information is tied to the evaluation of segments by the segmentation and targeting engine and can radically change a page. This eliminates the need for user profile providers to manipulate segments and they are free to focus on their expertise in providing rich user profile data. This also eliminates the need for WEM to store and/or synchronize user profile data with external sources. Instead, WEM can consume their user profile data and map them into the WEM segmentation and targeting engine.

FIG. 5 provides an example of segment configuration XML code 500 that demonstrates how to access external user profile data according to one embodiment disclosed herein. In the example of FIG. 5, there are two sample segments: "Large Company" and "Chrome." The "Large Company" segment has a condition involving a user profile variable "employee_count" of a provider "ProfilePro" in the pluggable provider framework. The user profile variable "employee_count" (and its value) is managed by a provider system for which the provider "ProfilePro" is implemented in the pluggable provider framework. At runtime, a value of the user profile variable "employee_count" is fetched from the provider system using a provider connection established via the provider "ProfilePro" in the pluggable provider framework and is used to determine whether the condition is met (e.g., employee_count>3500). If so, the "Large Company" segment is true. Although a numeric example is shown, other types of values may also be possible (e.g., text strings, alphanumeric values, etc.).

The "Chrome" segment has a condition involving a header of a user-agent from a browser request. At runtime, a header of a user-agent from a browser request is parsed. If a string '.*Chrome.*' is found, the "Chrome" segment is true.

As the above example demonstrates, segment evaluation can be enhanced with external user profile data provided through the pluggable provider framework. Previously, through a user-agent of a browser request, it may be possible for a segmentation and targeting engine to infer that an end user visiting a website uses a particular type of browser but not that the end user works for a large company. Through user profile provider(s) implemented in the pluggable provider framework, the segmentation and targeting engine can now have the knowledge that the end user works for a large company and provide content that targets the large company segment.

Those skilled in the art will appreciate that, in addition to the example shown in FIG. 5, other ways to access external user profile data may also be possible. To this end, FIG. 6 provides another example of how to access external user profile data according to one embodiment disclosed herein. Specifically, the native representations of external user profile data (e.g., user profile beans) can be read in a smart list custom expression. The user profiles are accessible by the name specified during registration of the provider from the profile keyword. For example, to read a "ProfilePro" user profile, the value of the custom expression would be "profile.ProfilePro". FIG. 6 shows an example that gets the value of "employee_count" from the "ProfilePro" user profile via a user interface 600.

Figure 7A:
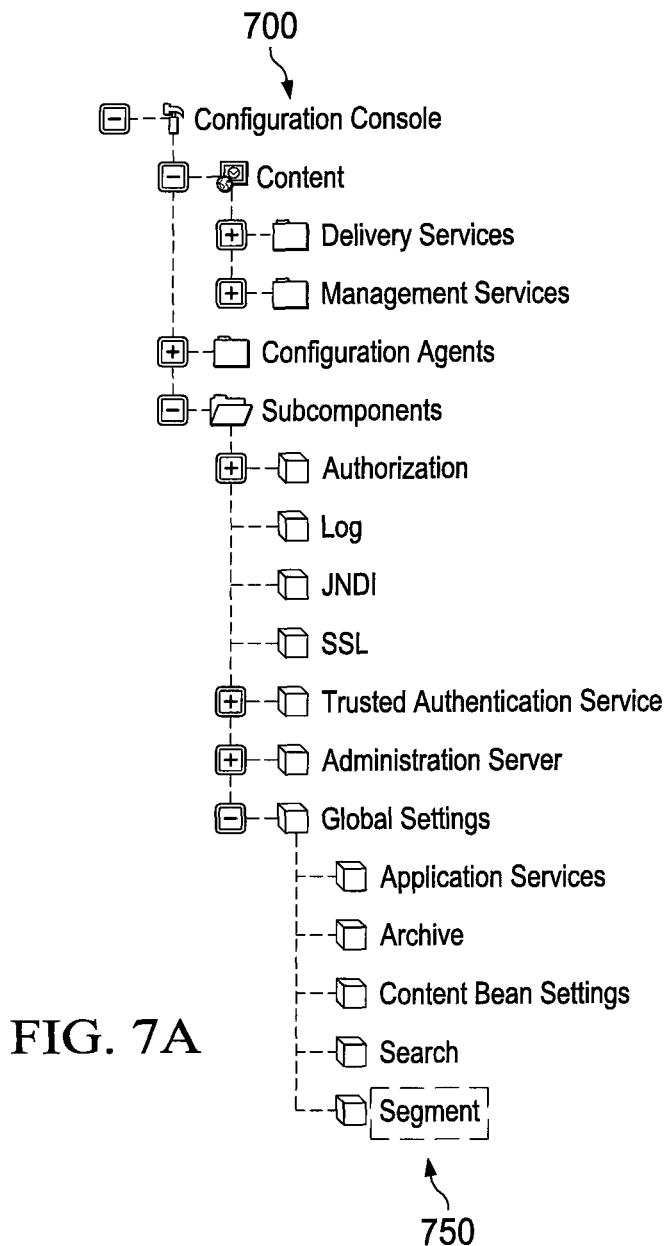
FIG. 7A depicts a diagrammatic representation a configuration console having various components including a global settings component for segment configuration in accordance with a representative embodiment disclosed herein.

FIG. 7A depicts a diagrammatic representation a configuration console 700, showing one example of how global settings of segment variable 750 may be accessed and configured in accordance with a representative embodiment disclosed herein. Segment variable 750 may have various configuration properties. FIG. 7B depicts a diagrammatic representation of a WEM user interface 740 of configuration console 700, showing one example of segment configuration with sample configuration properties 760 of segment variable 750 in accordance with a representative embodiment disclosed herein. Values defined for these configuration properties can be globally applied to each instance of a user profile segmentation provider.

User profiles fetched from third-party user profile services may differ from provider to provider. FIG. 8 is an example of a user profile 800 fetched from a first third-party user profile service provider in accordance with a representative embodiment disclosed herein. FIG. 9 is another example of a user profile 900 fetched from a second third-party user profile service provider in accordance with a representative embodiment disclosed herein. As illustrated in FIGS. 8 and 9, user profile 800 and user profile 900 from different third-party user profile service providers can have different attributes, variables, methods, style, format, etc.

WEM users can add one or more attributes, variables, and methods to user profiles fetched from third-party user profile services. FIG. 10 is an example of adding an address constructed from user profile attributes (1010), and a random number to simulate that a user could add arbitrary data (1020), in accordance with a representative embodiment disclosed herein. These methods (1000) can be added to the user profile bean class (e.g., SampleUserProfileProvider class 422 shown in FIG. 4). Such additions (by WEM users) are added to the provider implementation and WEM can access these synthesized attributes.

Figure 11A:
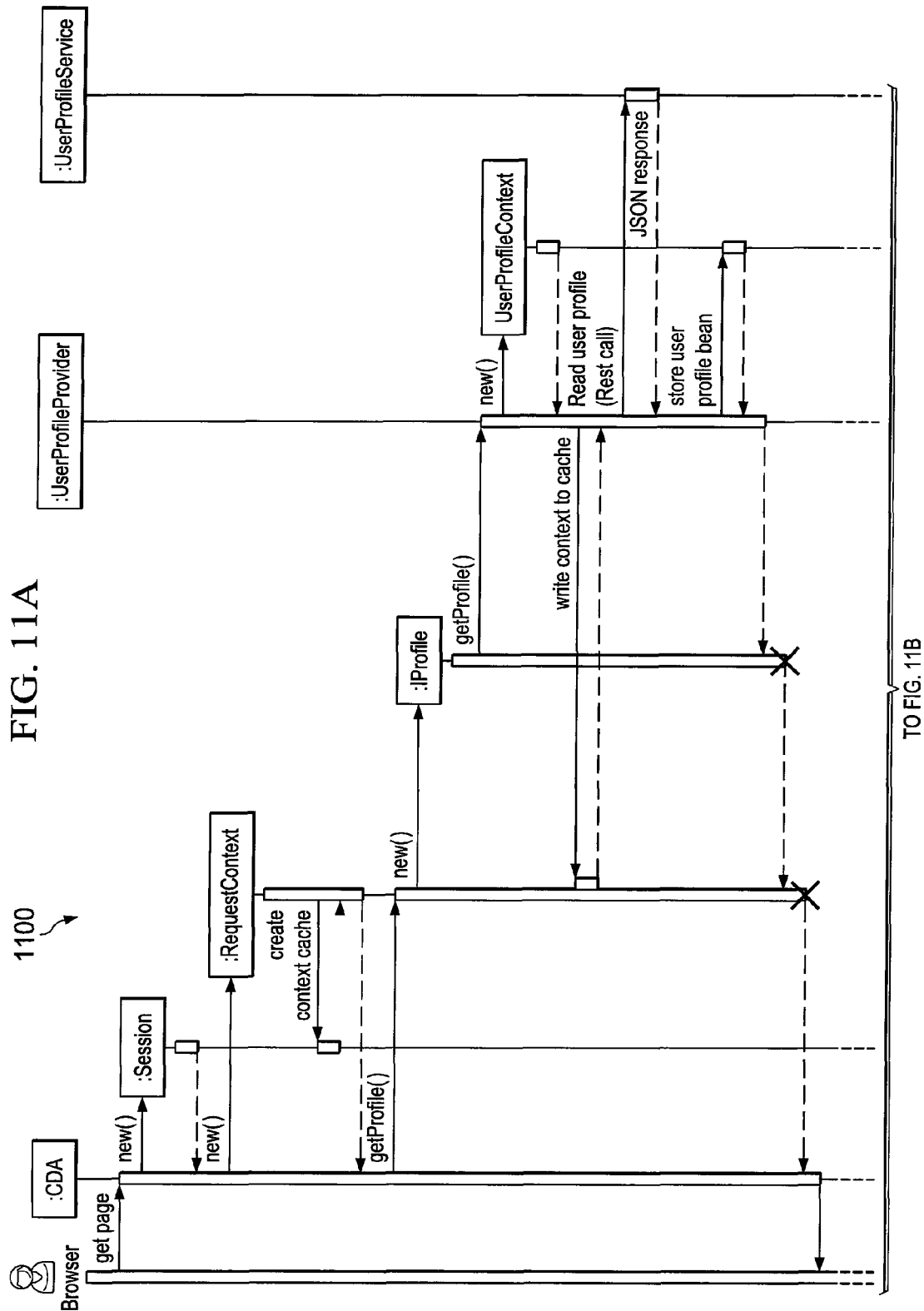
FIGS. 11A-11B depict a sequence diagram illustrating how user profile data may be fetched from a third-party user profile service in accordance with a representative embodiment disclosed herein.
Figure 11B:
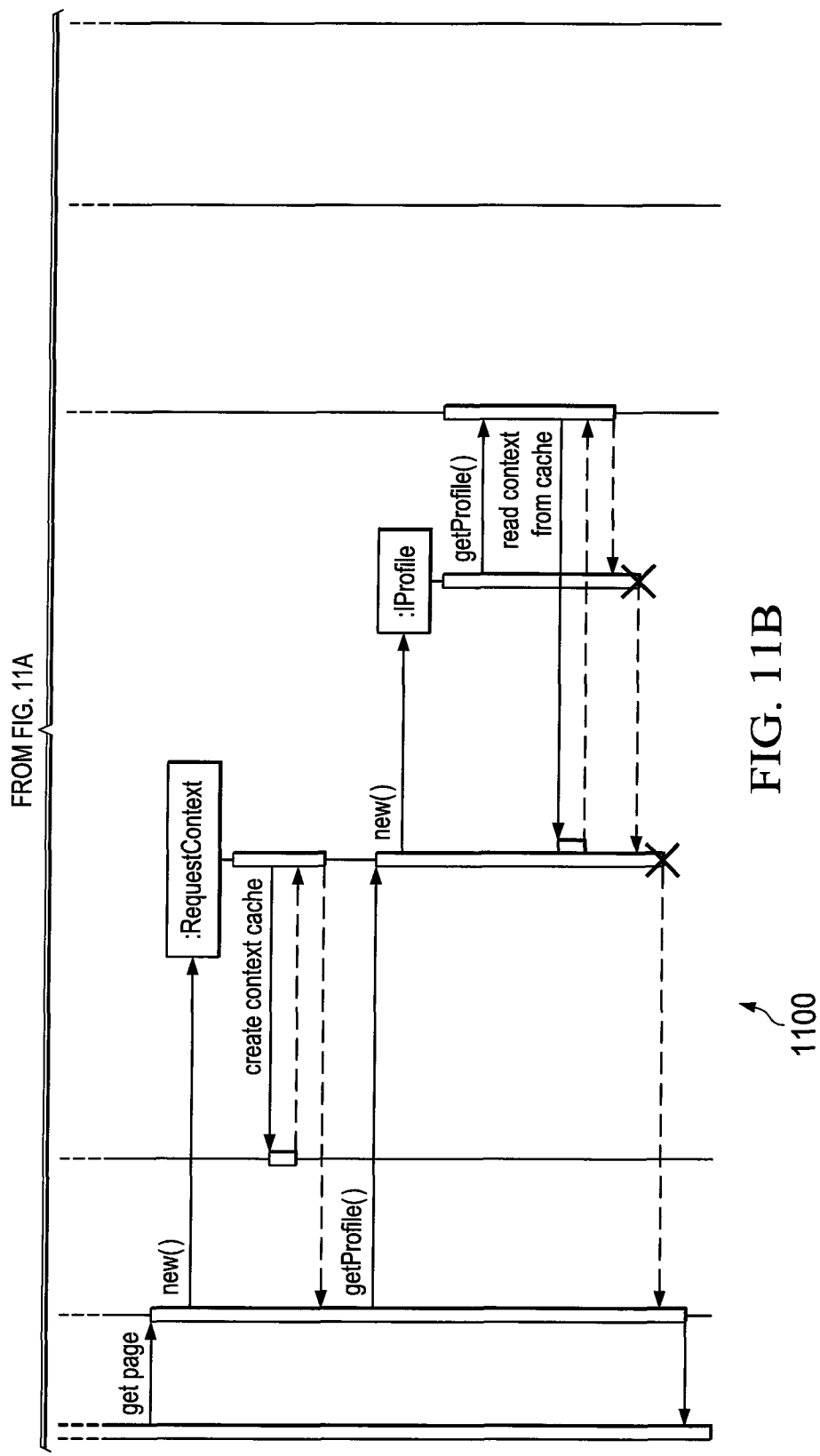

The user profile bean serves as the client data access to the user profile. The user profile bean type is specified by class name when the provider is registered. Upon the first attempt to read data from a user's profile, the provider fetches the data from the user profile service (hosted on the provider system), and writes the user attributes into an instance of the user profile bean. FIGS. 11A-11B depict a sequence diagram 1100 illustrating an example of this process. As demonstrated in FIGS. 11A-11B, in some embodiments, the external user profile data may be fetched once per a session. Again, the transport and format of the data from the provider to the service is transparent on the client side since the client (e.g., a browser running on a user device) only reads user profile data from the user profile bean.

As described above, user profiles can be enriched with external user profile data from one or more provider systems through a user profile enrichment framework of a web experience management system. In some embodiments, a method for external user profile integration may include establishing, through the user profile enrichment framework, a provider connection between the web experience management system running on one or more server machines and a provider system external to the web experience management system.

At the delivery stage, the provider connection may connect a page component of a network site and a provider service executing on the provider system. For example, responsive to a request for a page containing the page component, the web experience management system may query, via the provider connection, the provider service about a user accessing the network site. The web experience management system may receive, via the provider connection, a response from the provider service. The response may include external user profile data for the user accessing the network site. A user profile object may be generated using the external user profile data.

The user profile object may be communicated to a segmentation and targeting engine for determining and delivering contextual segment content tailored to the user based on the external user profile data from the provider system. In this way, the network site may provide the user with enhanced web experiences in real time. Since the external user profile data is integrated at the delivery stage at runtime, neither the network site nor the web experience management system needs to store the external user profile data and/or synchronize the external user profile data with the provider system(s).

In some embodiments, the provider connection may be established by configuring an implementation of a provider interface into the user profile enrichment framework of the web experience management system. The implementation may be provided by a provider system that is independent and/or external to the web experience management system. The provider interface may define behaviors for interfacing with the provider system and may contain one or more methods implementing the behaviors. The provider system may contain provider data. The web experience management system may dynamically discover the behaviors upon instantiation of provider implementation classes contained in the implementation of the provider interface to thereby establish the provider connection with the provider system.

In some embodiments, the behaviors may comprise session orientation. In some embodiments, the provider system may be session oriented and the web experience management system may automatically manage lifecycle of the provider connection accordingly. In some embodiments, the web experience management system may further establish a context for the provider connection when a user session is initiated, cache the context at a location that is local to the web experience management system, and insert the cached context into one or more subsequent requests for the user session. In some embodiments, the web experience management system may reset the user profile data from the provider system during the user session. In some embodiments, the context may comprise one or more conditions associated with the user accessing the network site.

In some embodiments, the user profile object may comprise a Java bean that encapsulates a plurality of objects into a single object. In some embodiments, the response from the provider service may comprise a JSON string. In some embodiments, the web experience management system may parse the JSON string into an instance of the user profile object.

In some embodiments, the user profile object may comprise a subset or superset of attributes returned from the provider service. In some embodiments, the web experience management system may customize the received external user profile object including filtering the attributes to generate a subset of the attributes and integrating the attributes with enhancement attributes to generate a custom user profile object. The segmentation and targeting engine may determine and deliver content to the network site based on the custom user profile object.

In some embodiments, the segmentation and targeting engine may define segmentation information corresponding to the user based on the user profile object and delivery content tailored to the user based on the segmentation information determined from the user profile object. In some embodiments, the segmentation and targeting engine may define segmentation information based on targeting rules for defining a website framework including templates, regions, and components on a web page and/or for defining a channel tailored to a group of users.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such product, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component. The scope of the present disclosure should be determined by the following claims and their legal equivalents.

What is claimed is:

1. A method for dynamic integration and delivery of content, comprising:
    establishing a provider connection between a web experience management system running on one or more server machines and a provider system external to the web experience management system, the provider connection connecting a page component of a network site and a provider service executing on the provider system, wherein the provider connection is established by:
        configuring an implementation of a provider interface into a user profile enrichment framework, the provider interface defining behaviors for interfacing with the provider system, the implementation of the provider interface including one or more methods implementing the behaviors; and
        the web experience management system dynamically discovering the behaviors upon instantiation of provider implementation classes contained in the implementation of the provider interface to thereby establish the provider connection with the provider system;
    at a delivery stage and responsive to a request for a page containing the page component, the web experience management system querying the provider service, via the provider connection, about a user accessing the network site;
    receiving, via the provider connection, a response from the provider service, the response including external user profile data for the user accessing the network site;
    generating a user profile object using the external user profile data; and
    communicating the user profile object to a segmentation and targeting engine for determining and delivering content tailored to the user based on the external user profile data from the provider system.

2. The method according to claim 1, wherein the provider system is session oriented, further comprising:
    automatically managing a lifecycle of the provider connection.

3. The method according to claim 1, wherein the provider system is session oriented, further comprising:
    establishing a context for the provider connection when a user session is initiated;
    caching the context; and
    inserting the cached context into one or more subsequent requests for the user session.

4. The method according to claim 3, further comprising:
    resetting the user profile data from the provider system during the user session.

5. The method according to claim 3, wherein the context comprises one or more conditions associated with the user accessing the network site.

6. The method according to claim 1, further comprising:
    defining segmentation information corresponding to the user based on the user profile object, the segmentation and targeting engine delivering content tailored to the user based on the segmentation information determined from the user profile object.

7. The method according to claim 6, wherein defining segmentation information is based on targeting rules for defining a website framework including templates, regions, and components on a web page and/or for defining a channel tailored to a group of users.

8. A system for dynamic integration and delivery of content, comprising:
    at least one processor;
    at least one non-transitory computer readable medium;
    stored instructions embodied on the at least one non-transitory computer readable medium and translatable by the at least one processor to perform:
        establishing a provider connection with a provider system external to the system, the provider connection connecting a page component of a network site and a provider service executing on the provider system, wherein the provider connection is established by:
            configuring an implementation of a provider interface into a user profile enrichment framework, the provider interface defining behaviors for interfacing with the provider system, the implementation of the provider interface including one or more methods implementing the behaviors; and
            dynamically discovering the behaviors upon instantiation of provider implementation classes contained in the implementation of the provider interface to thereby establish the provider connection with the provider system;
        at a delivery stage and responsive to a request for a page containing the page component, querying the provider service, via the provider connection, about a user accessing the network site;

receiving, via the provider connection, a response from the provider service, the response including external user profile data for the user accessing the network site;

generating a user profile object using the external user profile data; and communicating the user profile object to a segmentation and targeting engine for determining and delivering content tailored to the user based on the external user profile data from the provider system.

9. The system of claim 8, wherein the provider system is session oriented and wherein the stored instructions further translatable by the at least one processor to perform:

automatically managing a lifecycle of the provider connection.

10. The system of claim 8, wherein the provider system is session oriented and wherein the stored instructions further translatable by the at least one processor to perform:

establishing a context for the provider connection when a user session is initiated;

caching the context; and inserting the cached context into one or more subsequent requests for the user session.

11. The system of claim 10, wherein the stored instructions further translatable by the at least one processor to perform:

resetting the user profile data from the provider system during the user session.

12. The system of claim 10, wherein the context comprises one or more conditions associated with the user accessing the network site.

13. The system of claim 8, wherein the stored instructions further translatable by the at least one processor to perform:

defining segmentation information corresponding to the user based on the user profile object, the segmentation and targeting engine delivering content tailored to the user based on the segmentation information determined from the user profile object.

14. The system of claim 13, wherein defining segmentation information is based on targeting rules for defining a website framework including templates, regions, and components on a web page and/or for defining a channel tailored to a group of users.

15. The system of claim 8, wherein the user profile object comprises a Java bean that encapsulates a plurality of objects into a single object.

16. The system of claim 8, wherein the response from the provider service comprises a JavaScript Object Notation (JSON) string and wherein the stored instructions further translatable by the at least one processor to perform:

parsing the JSON string into an instance of the user profile object.

17. The system of claim 8, wherein the user profile object comprises a subset or superset of attributes returned from the provider service.

18. The system of claim 17, wherein the stored instructions further translatable by the at least one processor to perform:

customizing the received external user profile object including:

filtering the attributes to generate a subset of the attributes;

integrating the attributes with enhancement attributes to generate a custom user profile object, the segmentation and targeting engine determining and delivering content based on the custom user profile object.

19. A computer program product comprising a non-transitory computer-readable medium storing instructions translatable by a process of a web experience management system for:

establishing a provider connection between the web experience management system and a provider system external to the web experience management system, the provider connection connecting a page component of a network site and a provider service executing on the provider system, wherein the provider connection is established by:

configuring an implementation of a provider interface into a user profile enrichment framework, the provider interface defining behaviors for interfacing with the provider system, the implementation of the provider interface including one or more methods implementing the behaviors; and the web experience management system dynamically discovering the behaviors upon instantiation of provider implementation classes contained in the implementation of the provider interface to thereby establish the provider connection with the provider system;

at a delivery stage and responsive to a request for a page containing the page component, querying the provider service, via the provider connection, about a user accessing the network site;

receiving, via the provider connection, a response from the provider service, the response including external user profile data for the user accessing the network site;

generating a user profile object using the external user profile data; and communicating the user profile object to a segmentation and targeting engine for determining and delivering content tailored to the user based on the external user profile data from the provider system.

20. The computer program product of claim 19, wherein the provider system is session oriented and wherein the instructions are further translatable by the processor for automatically managing a lifecycle of the provider connection.

* * * * *